United States Patent [19]

Garcia

[11] 4,420,973
[45] Dec. 20, 1983

[54] MAGNETICALLY ATTACHABLE TIMING GAUGE FOR A FUEL INJECTOR

[76] Inventor: Guillermo E. Garcia, 830 Dos Robles Pl., Alhambra, Calif. 91801

[21] Appl. No.: 306,201

[22] Filed: Sep. 28, 1981

[51] Int. Cl.³ .................................. G01M 15/00
[52] U.S. Cl. ........................................ 73/119 A
[58] Field of Search .................... 73/119 A, 118; 33/180 AT, 181 AT

[56] References Cited

U.S. PATENT DOCUMENTS

| 4,098,233 | 7/1978 | Boyd | 73/119 A X |
| 4,202,207 | 5/1980 | Johnson et al. | 73/119 A |
| 4,362,050 | 12/1982 | Stumpp et al. | 73/119 A |

FOREIGN PATENT DOCUMENTS 2729317 1/1979 Fed. Rep. of Germany ... 73/119 A

Primary Examiner—Gerald Goldberg
Assistant Examiner—Tom Noland
Attorney, Agent, or Firm—Sellers and Brace

[57] ABSTRACT

A timing gauge is provided for use in adjusting the stroke of a fuel injector plunger of an internal combustion engine. The gauge has a probe of calibrated length fixed to a magnet effective to clamp the gauge firmly to the outer end of the injector plunger while the plunger is being adjusted. When the plunger is adjusted until the probe contacts a reference surface, an electrical circuit containing an indicating device is activated to inform the mechanic that the plunger is in precise adjustment. The gauge may be self-contained and include the indicator and its power supply.

13 Claims, 2 Drawing Figures

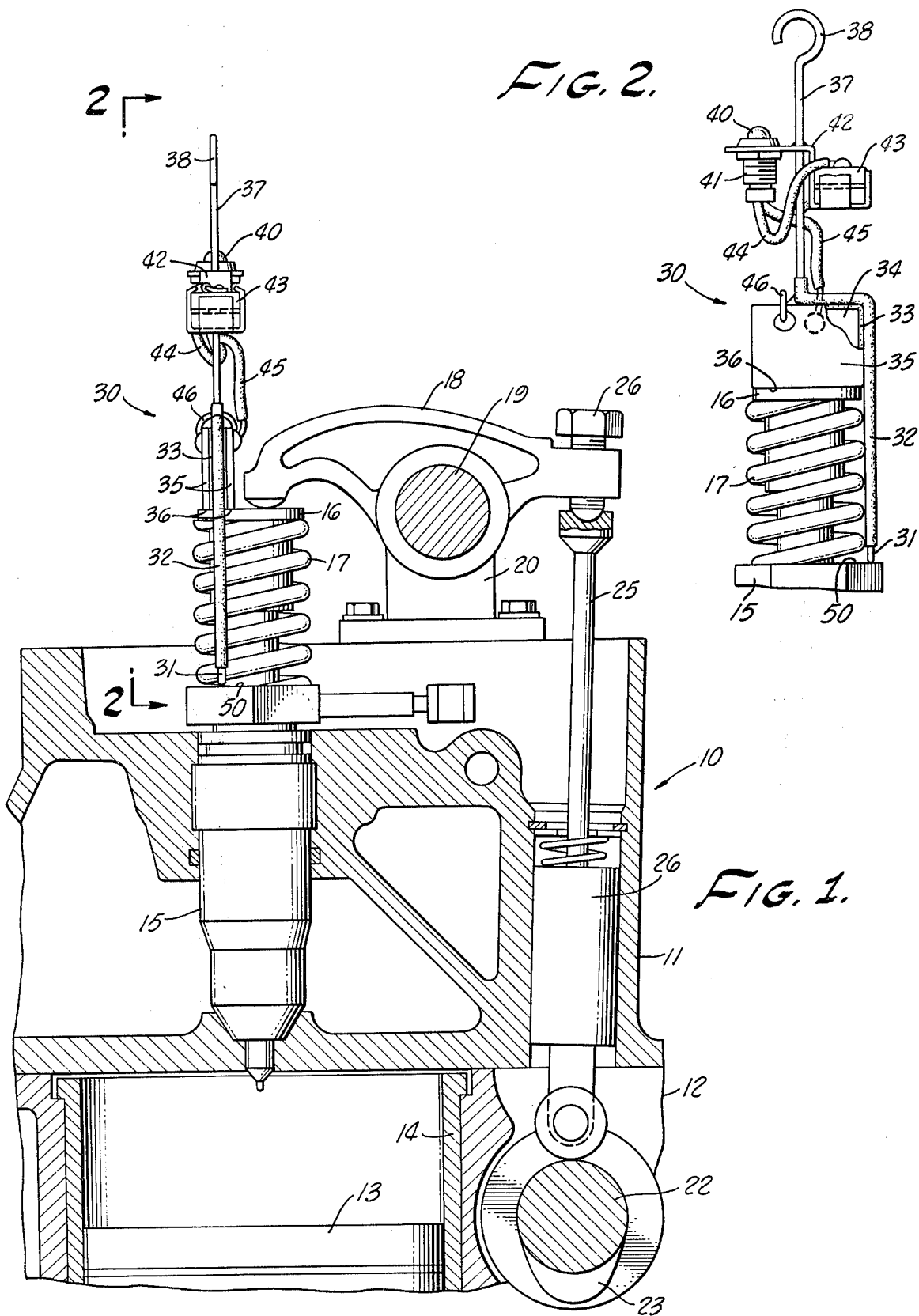

MAGNETICALLY ATTACHABLE TIMING GAUGE FOR A FUEL INJECTOR

This invention relates to timing gauges, and more particularly to a unique timing gauge fixed to a permanent magnet for securing the gauge to an injector plunger while it is being adjusted and operable to complete an activating circuit to an indicator when the injector is properly adjusted.

BACKGROUND OF THE INVENTION

The high performance and economical operation of internal combustion engines equipped with plunger type fuel injectors is dependent upon the precise adjustment of the injector stroke. Various proposals have been made for determining the initiation and the length of the injector stroke but each of these is attended by disadvantages and shortcomings avoided by this invention. One prior gauge utilizes a wiper arm rotatable about a stem insertable into a timing socket at the base of an injector plunger. The wiper is manually rotatable crosswise of the plunger end and engages the plunger surface lightly when the plunger is properly adjusted. If the gauge stem is not held strictly parallel to the plunger the resulting adjustment is erroneous. Furthermore, the accuracy of the adjustment is left to the varying judgement of different users as respects "light wiping pressure".

Other examples of prior art timing gauges are found in the U.S. Pats. to Boyd No. 4,098,233 and to Johnson No. 4,202,207. Boyd seeks to avoid the possibility of operating the first mentioned gauge at an angle to the plunger axis by a device having a countersunk collar loosely seating a headed stem. The collar is placed against the top of the plunger and with its stem seated in a timing bore at the base of the plunger. The injector plunger is then adjusted while the mechanic's finger is placed against the head of the stem. Adjustment ceases when the mechanic judges the stem head is flush with the adjacent end surface of the collar. Again the results achieved are dependent upon the mechanic's judgment, the sensitivity of his sense of touch, the calloused condition of his fingertips and their degree of cleanliness. Johnson seeks to avoid these shortcomings by utilizing a gauge having a reciprocated plunger supported within a sleeve insertable over a plunger and against a reference surface at its base. The gauge includes a light which remains inactive when the plunger is either too high or too low. The Johnson gauge is a complex assembly having numerous parts including an adjustable stop which must be precisely set and maintained in position. Moreover, and as is true of each of the other prior art gauges, his gauge must be held on the engine with one hand while the other is being used to adjust the rocker arm.

SUMMARY OF THE INVENTION

This invention avoids the foregoing and other shortcomings and disadvantages of prior timing gauges. This is accomplished by provision of a simple rugged assembly devoid of moving parts and the non-adjustable calibrated probe of which is securely fixed to a permanent magnet holding the gauge firmly clamped to the outer end of the injector plunger with the probe tip closely spaced from a reference surface at the base of the injector. An electrically energized indicator in circuit with the probe and the body of the engine is activated instantly that the plunger rocker is adjusted to achieve contact of the probe with the reference surface. The magnet anchors the gauge immovably in place and leaves the mechanic's hands free for adjustment purposes. The electrical indicator may be connected between the probe and the engine body or, preferably, the indicator and its battery may be mounted directed on the gauge.

Accodingly, it is a primary object of this invention to provide an improved fuel injector timing gauge having simple rugged means for securing the same releasably to an injector plunger.

Another object of the invention is the provision of a fuel injector timing gauge devoid of moving parts and equipped with permanent magnet means for clamping it temporarily to a fuel injector plunger.

Another object of the invention is the provision of a self-contained fuel injector timing gauge having a non-adjustable probe conneced in circuit with indicator means mounted on the gauge.

Another object of the invention is the provision of a self-contained fuel injector timing gauge usable to adjust the injector while installed on an engine and having fastenerless means for clamping the gauge temporarily attached to the injector.

These and other more specific objects will appear upon reading the following specification and claims and upon considering in connection therewith the attached drawing to which they relate.

Referring now to the drawing in which a preferred embodiment of the invention is illustrated:

FIG. 1 is a fragmentary vertical sectional view through a diesel engine cylinder showing the timing gauge magnetically clamped to the injector plunger with the plunger rocker arm adjusted to its proper operating position; and FIG. 2 is a fragmentary elevational view taken along line 2—2 on FIG. 1.

Referring moe particularly initially to FIG. 1, there is shown a fragmentary view through the upper end of one cylinder of a typical diesel engine, designated generally 10, having its head 11 suitably clamped to its main body 12 and having a piston 13 reciprocating in known manner within the piston sleeve 14. Each cylinder is provided with its own fuel injector 15 of known type provided with a fuel injecting plunger 16 urged to its extended position by a compression spring 17. This plunger is depressed by a rocker arm 18 journalled on a shaft 19 supported by brackets 20.

Rocker arm 18 is actuated by a camshaft 22 provided with a cam 23 which, upon rotation, actuates a push rod 25 having its lower end socketed in a tappet in accordance with known practice. The stroke of pushrod 25 is imparted to rocker arm 18 through an adjustable cap screw 26 mounted in a threaded bore of the rocker arm and having its rounded end socketed against the head of pushrod 25. The stroke of the pushrod is governed by the cam 23 and the effective stroke of the rocker arm and of plunger 16 is governed by the adjustment of cap screw 26.

My timing gauge, designated generally 30, has a calibrated probe 31, a major portion of which is covered with insulation 32. The midlength of this probe has two right angle bends offset from one another and between the legs of one of which a permanent magnet assembly is rigidly anchored as by strong cement 33. This assembly as here shown by way of example comprises a wafer permanent magnet 34 sandwiched between a pair of conductive pole piece plates 35, 35. Preferably, plates 35 extend slightly beyond all four peripheral edges of magnet 34 so that the resulting recesses provide an excellent seating channel for the adjacent portions of the insulation 32 of probe 31. The portion of the probe extending upwardly beyond magnet 34 provides a convenient manipulating handle 37 having a hook 38 at its upper end for engagement over a storage hook or hanger of a storage kit, not shown, for the gauge.

Preferably, and as herein shown, gauge 30 is provided with an indicator device for indicating when the injector plunger has been properly adjusted. This indicator may comprise a buzzer or an electric light, such as a neon bulb 40, mounted in a housing 41 clamped to a support 42 soldered or otherwise secured to handle 37. Support 42 also supports batteries 43 connected in series circuit by conductors 44, 45, with indicator 40 and with pole plates 35, 35, the latter preferably being interconnected by a bridging conductor 46.

The operation of my timing gauge will be readily apparent from the foregoing description of its simple, rugged components and their relationship to a typical fuel injector. Before applying the gauge to the injector, cap screw 26 is usually backed off slightly and the top of plunger 16 as well as the reference surface 50 at the base of the plunger are thoroughly cleaned. Thereafter, the mechanic simply lowers the gauge into seating engagement with the top of plunger 16 closely beside and crosswise of the adjacent end of rocker arm 18. The lower edges 36 of the pole piece plates 35 are accurately finished and lie in a plane normal to probe 31. The portion of this probe which projects downwardly beyond the edges 36 of the pole pieces is precalibrated to correspond precisely to the fuel injecting stroke for that particular injector plunger. One injector manufacturer currently manufactures injectors having four different strokes namely, 1.460 inches; 1.470 inches; 1.500 inches and 1.484 inches. Other manufacturers employ strokes of other lengths and gauges usable with these engines should be made with probes of the appropriate specified length.

Since the precaution has been taken to back off adjusting screw 26 slightly and to position the engine cam shaft 22 as shown in FIG. 1, the tip of probe 31 will be spaced slightly above the reference surface 50 and the injector plunger 16 will be fully extended. The operator now proceeds to apply a wrench to adjusting screw 26 and to wrench it clockwise slowly while carefully observing the indicator 40. The instant that the tip of probe 31 makes electrical contact with reference surface 50 an electrical circuit will be completed between the battery, indicator 40, pole piece 35, plunger 16, reference surface 50 and the tip of probe 31. If the mechanic performs the adjustment of the screw carefully and slowly the activation of indicator 40 may be feeble or of a flickering nature thereby informing the mechanic that negligible or minimal additional adjustment is needed. The timing adjustment is now complete and the mechanic tilts the gauge sidewise to disengage it for transfer to the next injector to be checked and adjusted. Once the gauge is seated on the plunger only a deliberate tilting or sliding action is necessary to dislodge it, and this is true irrespective of whether the gauge overlies an upright injector or underlies a downwardly extending injector.

Some mechanics have a preference for a gauge without a self-contained indicator and power supply. In this case, the mechanic employs an indicator with flexible leads provided with conductive clips at its ends. One terminal is clipped to pole piece plates 35 or to handle 37 and the other terminal is clipped to a power source grounded on the engine body.

While the particular magnetically attachable timing gauge for a fuel injector herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. A timing gauge for use in setting a fuel injector plunger while mounted in an engine said gauge comprising:

permanent magnet means having a conductive pole face adapted to hold said gauge firmly clamped to and supported solely by the outer end of an injector plunger;

a conductive probe secured to said magnet means and insulated therefrom, said probe extending a predetermined distance beyond said pole face and corresponding to the precise distance between the outer end of an injector plunger and a timing reference surface beside said plunger on an engine when the injector plunger is properly positioned to measure a fuel injection stroke; and said permanent magnet means and said probe being adapted to be connected in series with a source of power and with indicator means groundable on the engine whereby said indicator means is activated when the injector plunger is so adjusted that the end of said probe is in contact with said timing reference surface at the beginning of a fuel injection stroke.

2. A timing gauge as defined in claim 1 characterized in that said magnet means includes a permanent magnet sandwiched between a pair of conductive non-magnetic plates having an adjacent pair of edges cooperating to form a planar pole face lying normal to the portion of said probe extending outwardly away therefrom.

3. A timing gauge as defined in claim 1 characterized in that said magnetic means comprises a permanent magnetic wafer sandwiched between and bonded to a pair of pole plates of magnetic material.

4. A timing gauge as defined in claim 1 characterized in that said probe is fixedly secured to said magnet means.

5. A timing gauge as defined in claim 1 characterized in that said probe is insulated from said magnet means and non-adjustably secured thereto.

6. A timing gauge as defined in claim 1 characterized in the provision of battery means and a light mounted on said gauge and connected in series between said probe and the conductive face of said magnet means.

7. A timing gauge as defined in claim 6 characterized in that said battery means and said light are mounted on a handgrip secured to said magnet means.

8. A timing gauge as defined in claim 6 having no moving or adjustable parts.

9. A timing gauge as defined in claim 7 characterized in that said battery means and said light are mounted on said hand grip in an area spaced from said magnet means.

10. A unitary self-contained timing gauge for use in setting a fuel injector plunger, said gauge comprising:

permanent magnet means having a conductive pole face sized to clamp said gauge firmly to and supported solely by the outer end of a full injector plunger while operatively assembled to an engine having an injector timing reference surface beside said plunger; and a conductive probe fixed non-conductively to said magnet means and extending normal to and outwardly beyond said pole face by a predetermined distance corresponding precisely to the distance between said timing reference surface and the outer end of said plunger when said plunger is accurately adjusted to begin a fuel injection stroke.

11. A unitary timing gauge as defined in claim 10 characterized in that said indicating device comprises battery-powered light means mounted on said magnet means and connected in series between said pole face and said probe.

12. A timing gauge supportable solely on the plunger of an engine fuel injector while in use to set the optimum operating height of the plunger comprising:

an elongated probe extending a predetermined distance beyond a stop surface fixed to and lying normal to the axis of said probe, said stop surface including permanent magnet means effective to support said tool firmly against the outer transverse end of a fuel injector plunger with said probe lying alongside and parallel to one exterior side of said plunger with the tip thereof positioned to engage a timing gauge stop surface on the body of said fuel injector when said fuel injector is properly adjusted.

13. A timing gauge as defined in claim 12 characterized in that said probe is connected in circuit with electric indicator and a source of power therefor and said source of power being effective to energize said indicator means when the tip of said probe engages said timing gauge stop surface thereby to complete an electrical circuit to said indicator means and indicate that said injector plunger is properly adjusted.

* * * * *